(12) United States Patent
Krishnan

(10) Patent No.: US 11,870,600 B2
(45) Date of Patent: Jan. 9, 2024

(54) MOBILE APPLICATION BASED COMMISSIONING OF BUILDING CONTROL DEVICES

(71) Applicant: Honeywell International Inc., Charlotte, NC (US)

(72) Inventor: C. Navaneetha Krishnan, Thanjavur (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 218 days.

(21) Appl. No.: 17/168,827

(22) Filed: Feb. 5, 2021

(65) Prior Publication Data

US 2022/0255767 A1    Aug. 11, 2022

(51) Int. Cl.
| | |
|---|---|
| *H04L 12/28* | (2006.01) |
| *G05B 15/02* | (2006.01) |
| *H04L 41/0806* | (2022.01) |
| *H04L 41/08* | (2022.01) |

(52) U.S. Cl.
CPC .......... *H04L 12/2814* (2013.01); *G05B 15/02* (2013.01); *H04L 41/0806* (2013.01); *H04L 41/0883* (2013.01); *H04L 41/0889* (2013.01); *H04L 2012/2849* (2013.01)

(58) Field of Classification Search
None
See application file for complete search history.

(56) References Cited

U.S. PATENT DOCUMENTS

| | | |
|---|---|---|
| 8,725,298 B2 | 5/2014 | Wallaert |
| 9,588,514 B2 | 3/2017 | Christensen et al. |
| 9,719,887 B2 | 8/2017 | Ratilla et al. |

(Continued)

FOREIGN PATENT DOCUMENTS

| | | |
|---|---|---|
| DE | 102007062914 A1 | 6/2009 |
| WO | 2016156401 A1 | 10/2016 |
| WO | 2020162957 A1 | 8/2020 |

OTHER PUBLICATIONS

International Search Report and Written Opinion from related PCT Application No. PCT/US2017/038736, dated Oct. 17, 2017, 12 pages.

(Continued)

*Primary Examiner* — Hamza N Algibhah
*Assistant Examiner* — Gregory P Tolchinsky
(74) *Attorney, Agent, or Firm* — Seager, Tufte & Wickhem, LLP

(57) ABSTRACT

An application on a mobile device is informed of a relative position of each of a plurality of security devices within a building space by placing an icon for each of the plurality of security devices at a location on a floor plan that corresponds to the physical location of the corresponding security device. A scannable code encoding configuration information for the particular security device is scanned and saved using the mobile device. Additional configuration information for the particular security device is received from a user and is saved. These steps are repeated for each of the plurality of security devices. The saved first and second configuration information for each of the plurality of security devices are uploaded to a remote server and the building control system is operated using the uploaded first and second configuration information.

16 Claims, 12 Drawing Sheets

(56) References Cited

U.S. PATENT DOCUMENTS

| | | |
|---|---|---|
| 10,453,329 B2 | 10/2019 | Chauhan |
| 2003/0101108 A1 | 5/2003 | Botham et al. |
| 2003/0213842 A1* | 11/2003 | Jackson ............ G06K 19/07762 235/380 |
| 2004/0215669 A1 | 10/2004 | Mettala et al. |
| 2006/0087402 A1 | 4/2006 | Manning et al. |
| 2006/0282498 A1 | 12/2006 | Muro |
| 2007/0037522 A1 | 2/2007 | Liu et al. |
| 2009/0307255 A1* | 12/2009 | Park ....................... G06Q 10/10 707/999.102 |
| 2009/0313225 A1 | 12/2009 | Nordlinger |
| 2010/0005382 A1 | 1/2010 | Curran et al. |
| 2011/0087988 A1 | 4/2011 | Ray et al. |
| 2011/0118880 A1 | 5/2011 | Diwakar et al. |
| 2012/0063354 A1 | 3/2012 | Vanga et al. |
| 2012/0299747 A1 | 11/2012 | Schubert et al. |
| 2012/0330849 A1 | 12/2012 | Nielsen et al. |
| 2013/0073690 A1 | 3/2013 | DeSalvo et al. |
| 2013/0179354 A1 | 7/2013 | Seat |
| 2014/0061293 A1 | 3/2014 | Jayaprakash et al. |
| 2014/0129277 A1 | 5/2014 | Lavrov et al. |
| 2014/0262130 A1 | 9/2014 | Yenni et al. |
| 2014/0262134 A1 | 9/2014 | Arensmeier et al. |
| 2014/0266639 A1 | 9/2014 | Zises |
| 2014/0266755 A1 | 9/2014 | Arensmeier et al. |
| 2014/0282257 A1 | 9/2014 | Nixon et al. |
| 2014/0358285 A1 | 12/2014 | Aggarwal et al. |
| 2015/0169791 A1 | 6/2015 | Lavrov et al. |
| 2015/0198938 A1* | 7/2015 | Steele .................... B25J 9/1689 700/275 |
| 2015/0213203 A1* | 7/2015 | Cumbie ................. G16H 10/65 705/3 |
| 2016/0100437 A1 | 4/2016 | Armstrong et al. |
| 2016/0110467 A1* | 4/2016 | Hern .................... G06F 16/9554 235/375 |
| 2016/0132046 A1 | 5/2016 | Beoughter et al. |
| 2016/0327296 A1 | 11/2016 | Leising et al. |
| 2018/0012173 A1 | 1/2018 | Leen et al. |
| 2018/0069932 A1 | 3/2018 | Tiwari et al. |
| 2019/0116087 A1* | 4/2019 | Hiller ..................... H04W 4/70 |

OTHER PUBLICATIONS

European Office Action, Application No. 17824697.1, pp. 4, dated Oct. 6, 2020.
"AMS Suite: Intelligent Device Manager with the DeltaV™ System", http://www2.emersonprocess.com/siteadmincenter/PM%20As~set%20Optimization%Documents/ProductDataSheets/amsdm_ds_amsdeltav.PDF, 5 pp. Apr. 2015.
Extended European Search Report, European Patent Office, EP Application No. 22152104.0, dated Jul. 4, 2022 (9 pgs).

* cited by examiner

MOBILE APPLICATION BASED COMMISSIONING OF BUILDING CONTROL DEVICES

TECHNICAL FIELD

The present disclosure relates generally to commissioning of building control devices. More particularly, the present disclosure relates using a mobile application in commissioning of building control devices.

BACKGROUND

Building control systems, such as but not limited to Heating, Ventilation and/or Air Conditioning (HVAC) control systems, Lighting Control systems, Fire Alarm and/or Suppression Systems and Building Security Systems, can include a large number of building control devices installed across a facility. For example, a building security system can include a large number of security devices such as but not limited to security cameras and access control devices installed across a facility. Once each of the building control devices are installed, they need to be configured or commissioned. It will be appreciated that a large facility may include hundreds or even thousands of building control devices. Configuring each of the building control devices can be a lengthy, time-consuming process in which errors can easily occur. What would be desirable are methods and systems for using a mobile device to help configure each of the installed building control devices in a simple and less error prone manner.

SUMMARY

The present disclosure relates to using a mobile application in commissioning of building control devices. In one example, an illustrative method provides for configuring a plurality of security devices using an application running on a mobile device. The application on the mobile device is used to access a floor plan that corresponds to a building space having the plurality of security devices each installed at a corresponding physical location in the building space. The plurality of security devices awaiting configuration. The application is informed by a user of the mobile device of a relative position of each of the plurality of security devices within the building space by placing an icon for each of the plurality of security devices at a location on the floor plan that corresponds to the physical location of the corresponding security device in the building space. A scannable code that is secured relative to a particular security device of the plurality of security devices is scanned using the mobile device, such as using the camera of the mobile device. The scannable code encodes first configuration information of the particular security device, which may be decoded by the mobile device. Second configuration information for the particular security device is received from the user of the mobile device via one or more screens that are displayed by the application running on the mobile device. The first and second configuration information for the particular security device are saved within a memory of the mobile device. The scanning, receiving and saving steps are repeated for each of the plurality of security devices. The saved first and second configuration information for each of the plurality of security devices are uploaded to a remote server. The building control system is subsequently operated using the uploaded first and second configuration information.

In another example, an illustrative method provides for configuring a plurality of building control devices of a building control system using an application running on a mobile device. In this illustrative method, the application on the mobile device is used to access a floor plan corresponding to a building space having the plurality of building control devices each installed at a corresponding physical location in the building space. The application of the mobile device is used to display a list of building control devices. The application is informed of a relative position of each of the plurality of building control devices within the building space by a user dragging an icon from the list of building control devices for each of the plurality of building control devices and dropping the icon at a location on the floor plan that corresponds to the physical location of the corresponding building control device in the building space. A scannable code secured relative to a particular building control device of the plurality of building control devices is scanned using the mobile device (e.g. using a camera of the mobile device). The scannable code encodes first configuration information for the particular building control device. Second configuration information for the particular building control device is received from the user via one or more screens that are displayed by the application running on the mobile device. The first and second configuration information for the particular building control device are saved within a memory of the mobile device. The scanning, receiving and saving steps are repeated for each of the plurality of building control devices. The saved first and second configuration information for each of the plurality of building control devices are uploaded to a remote server. The building control system is subsequently operated using the uploaded first and second configuration information.

In another example, a non-transient, computer-readable storage medium has instructions stored thereon. When the instructions are executed by one or more processors of a mobile device, the mobile device is caused to access a floor plan corresponding to a building space having a plurality of security devices installed therein that are awaiting configuration. A user is allowed to inform the application of a relative position of each of the plurality of security devices within the building space by placing an icon representing each of the plurality of security devices in an appropriate position within the floor plan. The user is allowed to scan a scannable code disposed relative to a particular security device of the plurality of security devices in order to identify the particular security device, and to enter appropriate information for the identified security device on one or more screens that are displayed by the application running on the mobile device. The mobile device is caused to save a configuration for the particular security device within a memory of the mobile device. The mobile device is caused to repeat the scanning, configuring and saving steps for each of the plurality of security devices and to upload the saved configurations for each of the plurality of security devices to a remote server.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
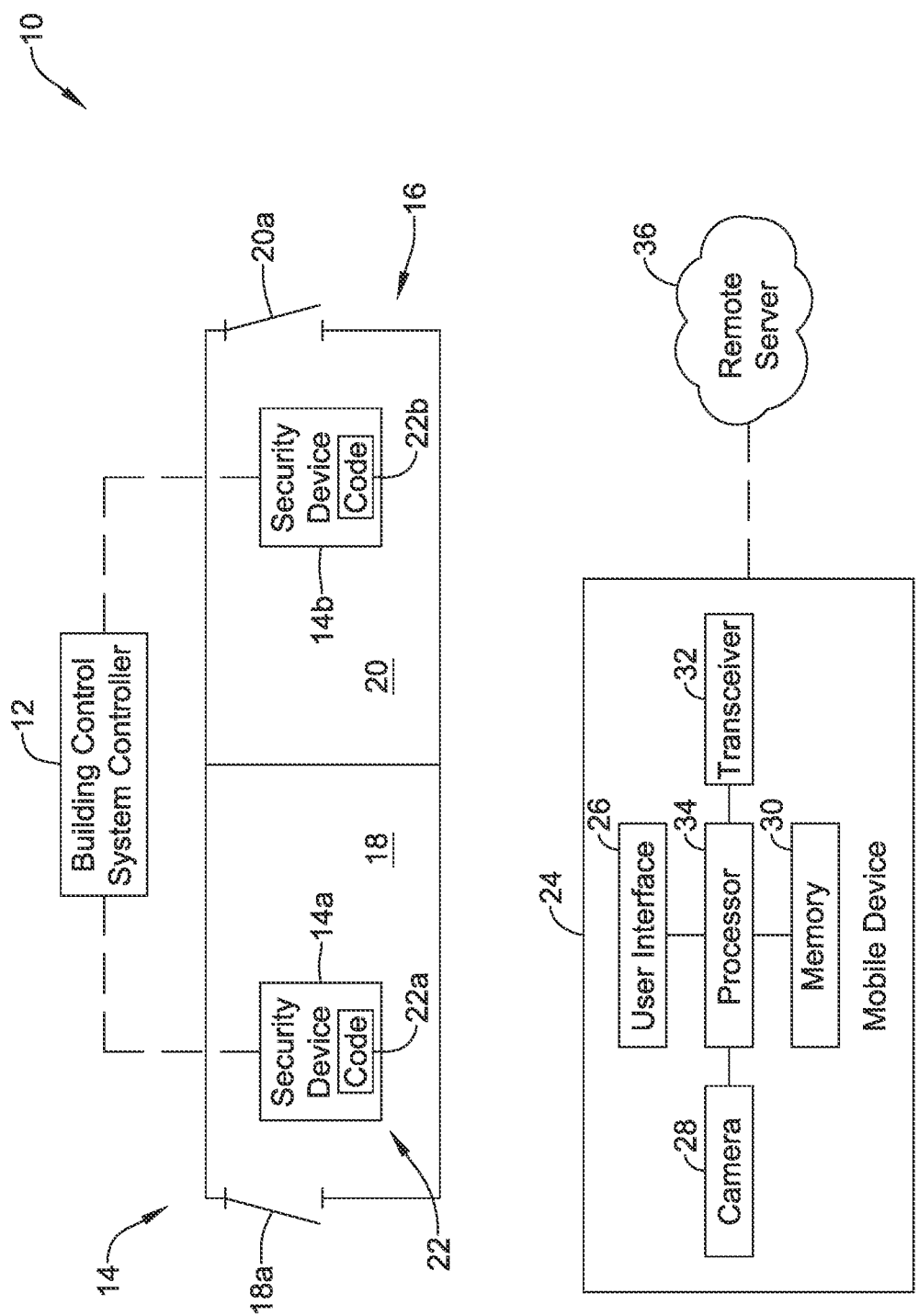
FIG. 1 is a schematic block diagram of an illustrative building control system including an illustrative mobile device useful in configuring the illustrative building control system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative building control system 10. While the building control system 10 may represent any suitable building control system such as a Heating, Ventilation and/or Air Conditioning (HVAC) system, a Lighting Control system, a Fire Alarm and/or Suppression System and/or a Security System with any suitable building control devices, for simplicity and clarity FIG. 1 just shows security devices. Thus, FIG. 1 shows an illustrative building control system 10 that includes a building control system controller 12 that is operably coupled with security devices 14. The security devices 14 are individually labeled as 14a and 14b. It will be appreciated that the building control system 10 may include any number of security devices 14, and in some cases may include a considerably greater number of security devices 14. A security device 14 may be considered as an example of a building control device. Each of the security devices 14 may independently represent a video camera. Each of the security devices 14 may independently represent an access control device. Examples of access control devices include card readers, electronic door locks and the like. The security devices 14 are shown positioned within a floor plan 16. The floor plan 16 is shown schematically, and merely includes a first room or space 18 and a second room or space 20. While only a pair of rooms 18, 20 are shown, it will be appreciated that the floor plan 16 may include additional rooms or spaces.

The room 18 includes a doorway 18a and the room 20 includes a doorway 20a. In some cases, for example, the security device 14a may be considered as being disposed at a position in which the security device 14a may be able to control access through the doorway 18a, and/or may be in a position in which the security device 14a is able to view the doorway 18a and thus can see individuals passing or attempting to pass through the doorway 18a. Similarly, the security device 14b may be considered as being disposed at a position in which the security device 14b may be able to control access through the doorway 20a, and/or may be in a position in which the security device 14b is able to view the doorway 20a and thus can see individuals passing or attempting to pass through the doorway 20a.

Before each of the security devices 14 can be put into operation, each of the security devices 14 typically need to be configured or commissioned with the building control system 10. To that end, each of the illustrative security devices 14 include a code 22, individually labeled as 22a and 22b. Each of the codes 22 may independently be a bar code, a QR code or any other code that can be scanned or entered in order to ascertain information that is represented within the code 22. The code 22 may be printed on a housing of the security device 14, for example, or the code 22 may be positioned inside of the housing, which necessitates removal of the housing to expose the code 22. The code 22 may be printed on a sticker that is disposed relative to the corresponding security device 14. In some instances, the code 22 includes information pertaining to the particular security device 14 such as but not limited to a Media Access Control (MAC) address, sometimes referred to as a physical address, of the particular security device 14. The code 22 may also include information such as device name, device model number, communication protocols and the like.

In some cases, a mobile device 24 may be used to scan the code 22 in order to obtain the information represented within the code 22. The mobile device 24 may be a tablet or smartphone, for example, and includes a user interface 26. The user interface 26 may include a display of the mobile device 24. The mobile device 24 may include a keyboard that is displayed on the display and that is touch-sensitive. The mobile device 24 may be sensitive to a person sliding their finger around the displayed keyboard, much in the way that this technique can be used when texting. The user interface 26 may include a voice interface, that allows a person to enter information by talking to the mobile device 24. The illustrative mobile device 24 includes a camera 28 that may be used to scan the code 22, for example. In some instances, the camera 28 may be considered as being part of the user interface 26, since the camera 28 may be used to provide information to the mobile device 24.

The mobile device 24 includes a memory 30 that may be used to store executable programs for execution by the mobile device 24. The memory 30 may be used to store configuration information as the configuration information is entered/scanned into the mobile device 24. Once a user uses the mobile device 24 to scan the code 22, and the mobile device 24 receives/decodes the configuration information that is represented within the code 22, the mobile device 24 may display one or more screens that allow the user to enter additional configuration information into the mobile device 24. The information represented within the code 22 may be referred to as being first configuration information while the information subsequently entered by the user may be referred to as being second configuration information.

The illustrative mobile device 24 includes a transceiver 32 that allows the mobile device 24 to communicate with other devices. The transceiver 32 may be configured to allow the mobile device 24 to communicate over cellular networks, for example. In some cases, the transceiver 32 may also be configured to communicate via other wireless communication protocols, such as but not limited to Bluetooth and/or Wi-Fi. The transceiver 32 may represent two or more distinct transceivers, each configured to communicate via a different wireless communication protocol. The illustrative mobile device 24 includes a processor 34 that is operably coupled with the user interface 26, the camera 28, the memory 30 and the transceiver 32. While shown as a single processor 34, it will be appreciated that in some cases the mobile device 24 may have two or more distinct processors 34. The processor 34 may be configured to execute an executable application that is stored in the memory 30, and that allows the mobile device 24 to scan the codes 22, for example, and to display appropriate screens that allow the user to enter additional (e.g. second) configuration information.

In some cases, the transceiver 32 allows the mobile device 24 to communicate with one or more of the security devices 14. In some instances, the transceiver 32 allows the mobile device 23 to communicate with a remote server 36. The remote server 36 may be cloud-based, for example, and may represent one or more distinct servers or other computing resources. The remote server 36 may communicate with the building control system controller 12, for example, and thus may be able to download information to the building control system controller 12 and/or to upload information from the building control system controller 12. The remote server 36 may be configured to receive either directly or indirectly all of the configuration information, such as the first configuration information and the second configuration information, pertaining to each of the security devices 14 from the mobile device 24.

Figure 2:
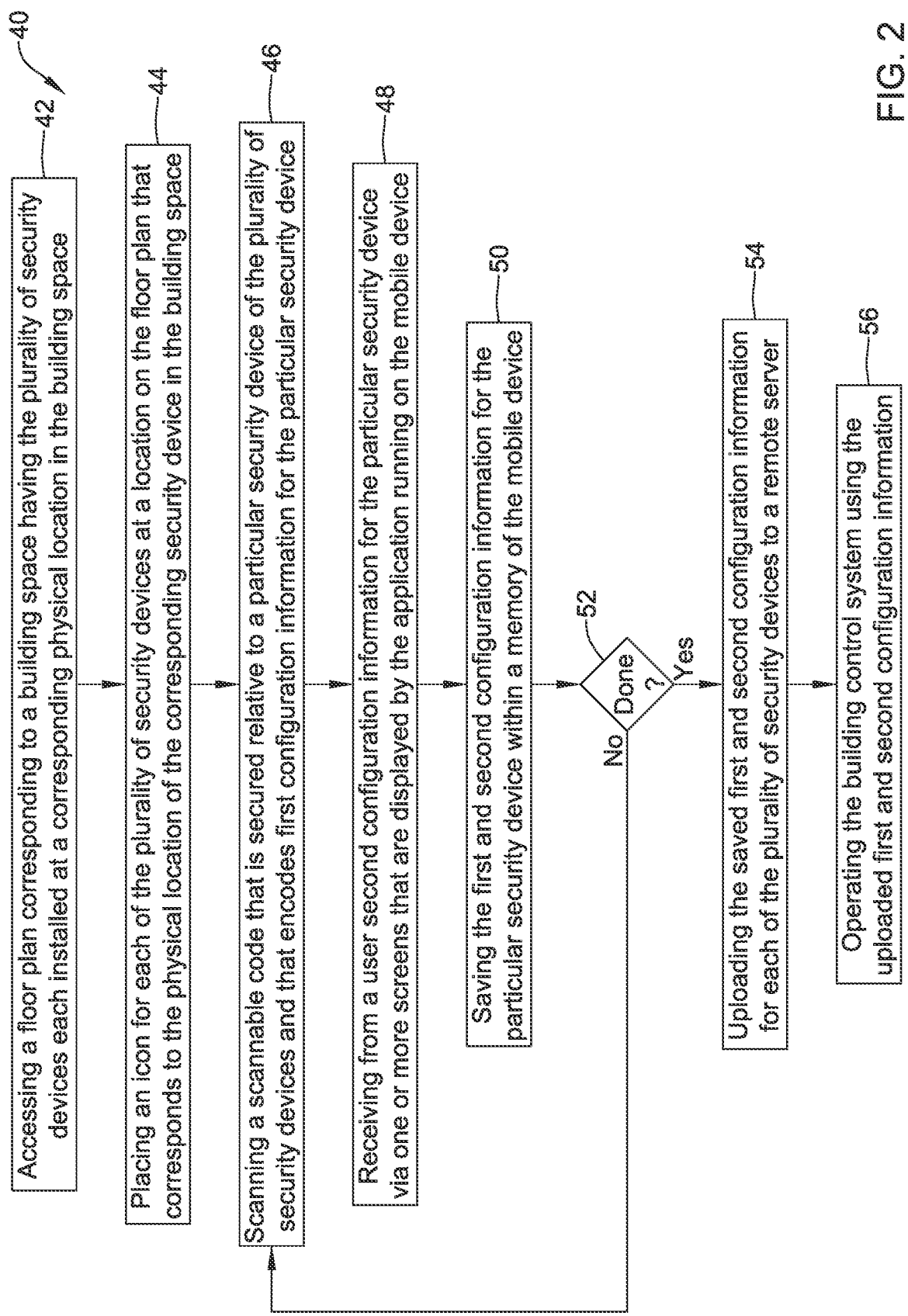
FIG. 2 is a flow diagram showing an illustrative method of configuring a plurality of security devices.

FIG. 2 is a flow diagram showing an illustrative method 40 of configuring a plurality of security devices (such as the security devices 14) of a building control system (such as the building control system 10) using an application running on a mobile device (such as the mobile device 24. An application on the mobile device is used to access a floor plan corresponding to a building space having the plurality of security devices each installed at a corresponding physical location in the building space, the plurality of security devices awaiting configuration, as indicated at block 42. Using the application on the mobile device to access a floor plan may include scanning or taking a photo of an available copy of the floor plan using a camera (such as the camera 28) of the mobile device. Using the application on the mobile device to access a floor plan may include downloading the floor plan from a remote source. In some instances, the floor plan may itself be programmed into the application running on the mobile device.

In some cases, using the application on the mobile device to access a floor plan may also include accessing a list of security devices installed in the building along with corresponding icons for each of the security devices included in the list of security devices. The application is informed of a relative position of each of the plurality of security devices within the building space by placing an icon for each of the plurality of security devices at a location on the floor plan that corresponds to the physical location of the corresponding security device in the building space, as indicated at block 44. This may include dragging each icon from the list of security devices and dropping the icon at a location on the floor plan that corresponds to the physical location of the corresponding security device in the building space. In some cases, the location of the icons for at least some of the security devices may be pre-placed at locations on the floor plan in accordance with a predefined design specification for the building. When so provided, and in some cases, the user of the mobile device may be allowed to move the icons from their pre-placed locations on the floor plan as necessary to match the actual installation location of the corresponding security devices in the building.

A scannable code secured relative to a particular security device of the plurality of security devices is scanned using the mobile device (e.g. via the camera 28). The scannable code encodes first configuration information for the particular security device, as indicated at block 46. This may include removing a cover of the particular security device in order to access the scannable code. In some cases, the scannable code may be a bar code or a QR code that is scannable by the camera 28 of the mobile device. The first configuration information that is encoded by the scannable code may include, for example, a unique identifier that uniquely identifies the particular security device. The first configuration information that is encoded by the scannable code may include, for example, one or more of a Media Access Control (MAC) address for the particular security device, model information for the particular security device, and/or any other suitable configuration information.

Second configuration information for the particular security device may be received from a user via one or more screens that are displayed by the application running on the mobile device, as indicated at block 48. In some cases, the second configuration information may include a network address (e.g. IP address) for the particular security device. The first and second configuration information for the particular security device are saved within a memory of the mobile device, as indicated at block 50.

At decision block 52, a determination is made as to whether all of the security devices have been configured. This determination may be made by the user, for example. If not, control reverts back to block 46 and the process continues. However, if at decision block 52 the determination is made that all of the security devices have been configured, control passes to block 54, where the saved first and second configuration information for each of the plurality of security devices is uploaded to a remote server (such as the remote server 36). In some cases, the scanning step (block 46), the receiving step (block 48) and the saving step (block 50) may be performed for each of the security devices before the remote server 36 is online or is otherwise available to receive the upload of the first and second configuration information. The building control system is subsequently operated using the uploaded first and second configuration information, as indicated at block 56.

In some cases, receiving from the user the second configuration information may include soliciting from the user second configuration information needed to configure the particular security device via one or more screens that are displayed by the application running on the mobile device, and accepting from the user at least some of the solicited information via one or more screens that are displayed by the application running on the mobile device. At least some of the security devices may include security cameras and access control devices. In some cases, the plurality of security devices installed within the building space are divided into a plurality of groups, with a different user assigned to each group, wherein each user uses a different mobile device for configuring each of the security devices within their assigned group, and the different users uploading their saved first and second configuration information for each of the security devices in their assigned group to the remote server.

Figure 3:
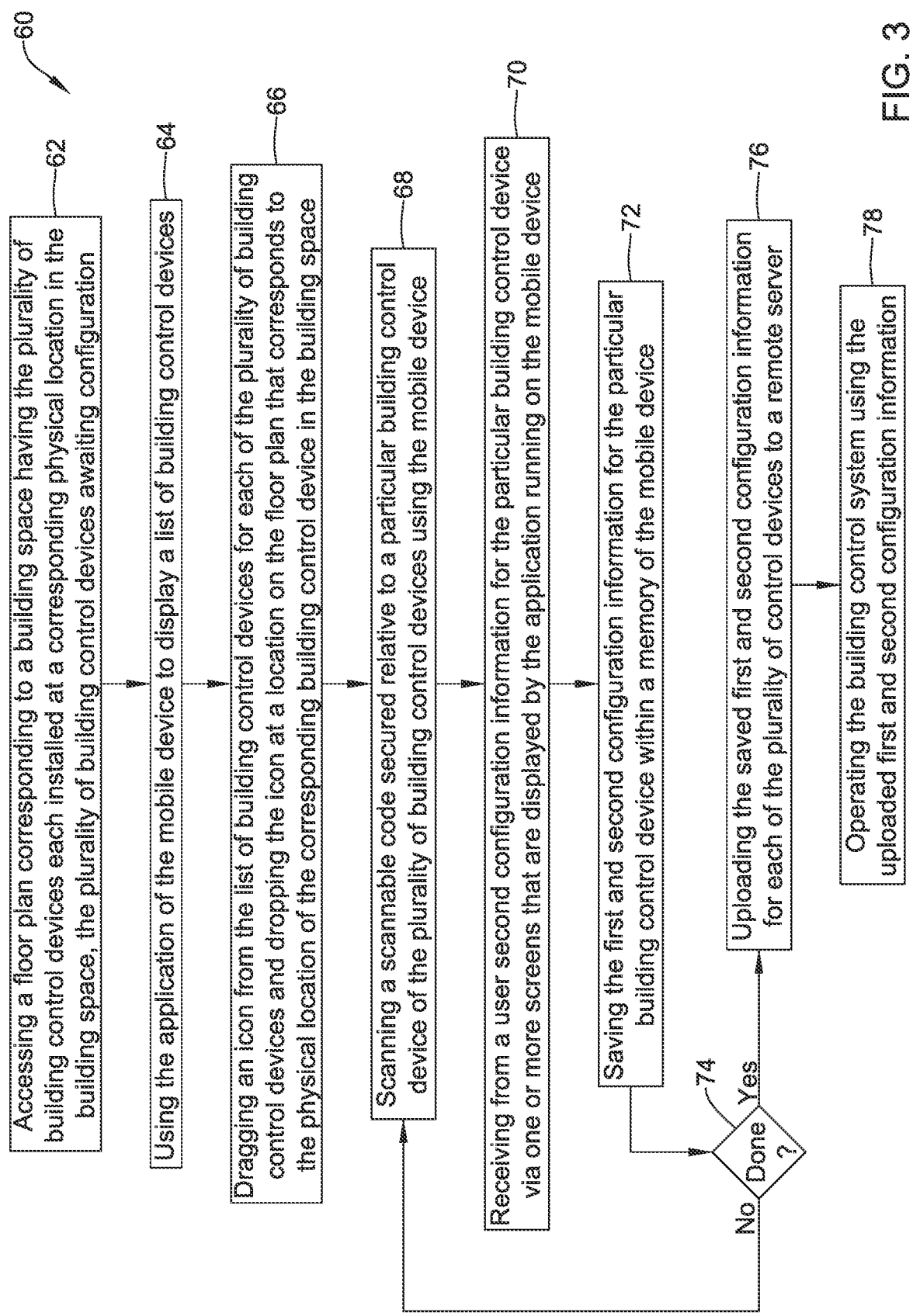
FIG. 3 is a flow diagram showing an illustrative method of configuring a plurality of building control devices.

FIG. 3 is a flow diagram showing an illustrative method 60 of configuring a plurality of building control devices of a building control system using an application running on a mobile device. The illustrative method 60 includes using the application on the mobile device to access a floor plan corresponding to a building space having the plurality of building control devices each installed at a corresponding physical location in the building space, the plurality of building control devices awaiting configuration, as indicated at block 62. The application of the mobile device is used to display a list of building control devices, as indicated at block 64. The application is informed of a relative position of each of the plurality of building control devices within the building space by a user dragging an icon from the list of building control devices for each of the plurality of building control devices and dropping the icon at a location on the floor plan that corresponds to the physical location of the corresponding building control device in the building space, as indicated at block 66. In some cases, the location of the icons for at least some of the building control devices may be pre-placed at locations on the floor plan in accordance with a predefined design specification for the building. When so provided, and in some cases, the user of the mobile device may be allowed to move the icons from their pre-placed locations on the floor plan as necessary to match the actual installation location of the corresponding building control devices in the building.

A scannable code secured relative to a particular building control device of the plurality of building control devices is scanned using the mobile device (e.g. camera 28). The scannable code encodes first configuration information for the particular building control device, as indicated at block 68. The first configuration information may include unique identifier that uniquely identifies the particular building control device. The first configuration information may include one or more of a Media Access Control (MAC) address for the particular building control device, model information for the particular building control device and/or any other suitable configuration information.

Second configuration information for the particular building control device may be received from a user via one or more screens that are displayed by the application running on the mobile device, as indicated at block 70. In some cases, the second configuration information may include a network address (e.g. IP address) for the particular building control device. The first and second configuration information for the particular building control device are saved within a memory of the mobile device, as indicated at block 72.

At decision block 74, a determination is made as to whether all of the building control devices have been configured. This determination may be made by the user, for example. If not, control reverts back to block 68 and the process continues. However, if at decision block 74 the determination is made that all of the building control devices have been configured, control passes to block 76, where the saved first and second configuration information for each of the plurality of building control devices is uploaded to a remote server (such as the remote server 36). The building control system is subsequently operated using the uploaded first and second configuration information, as indicated at block 78.

Figure 4:
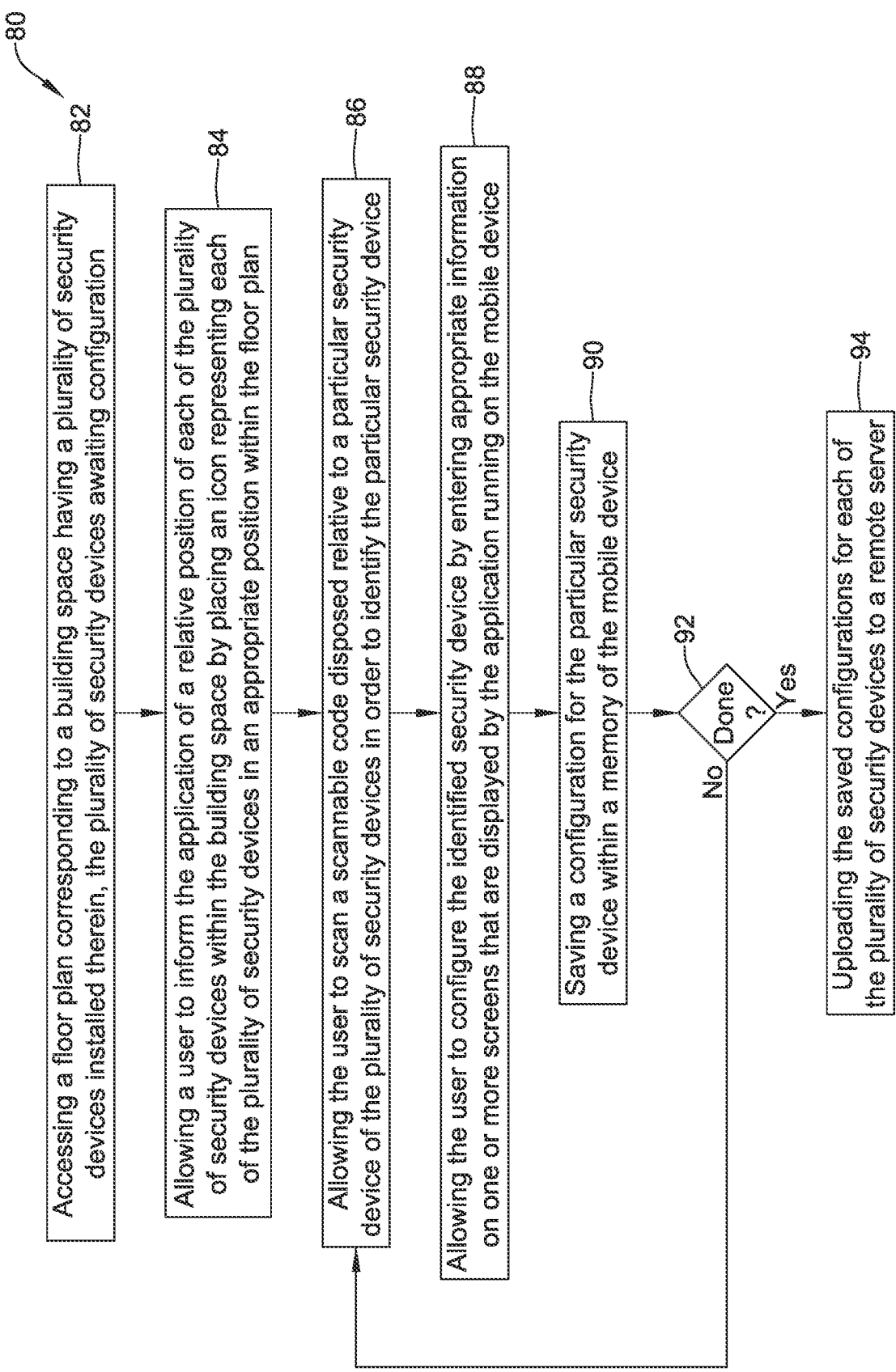
FIG. 4 is a flow diagram showing an illustrative method of configuring a plurality of security devices.

FIG. 4 is a flow diagram showing an illustrative method 80. The illustrative method 80 includes accessing a floor plan corresponding to a building space having a plurality of security devices installed therein, the plurality of security devices awaiting configuration, as indicated at block 82. A user is allowed to inform the application of a relative position of each of the plurality of security devices within the building space by placing an icon representing each of the plurality of security devices in an appropriate position within the floor plan, as indicated at block 84. The user is allowed to scan a scannable code disposed relative to a particular security device of the plurality of security devices in order to identify the particular security device, as indicated at block 86. The user is allowed to configure the identified security device by entering appropriate information on one or more screens that are displayed by the application running on the mobile device, as indicated at block 88. A configuration for the particular security device is saved within a memory of the mobile device, as indicated at block 90.

At decision block 92, a determination is made as to whether all of the security devices have been configured. This determination may be made by the user, for example. If not, control reverts back to block 86 and the process continues. However, if at decision block 92 the determination is made that all of the security devices have been configured, control passes to block 94, where the saved first and second configuration information for each of the plurality of security devices is uploaded to a remote server (such as the remote server 36).

Figure 5:
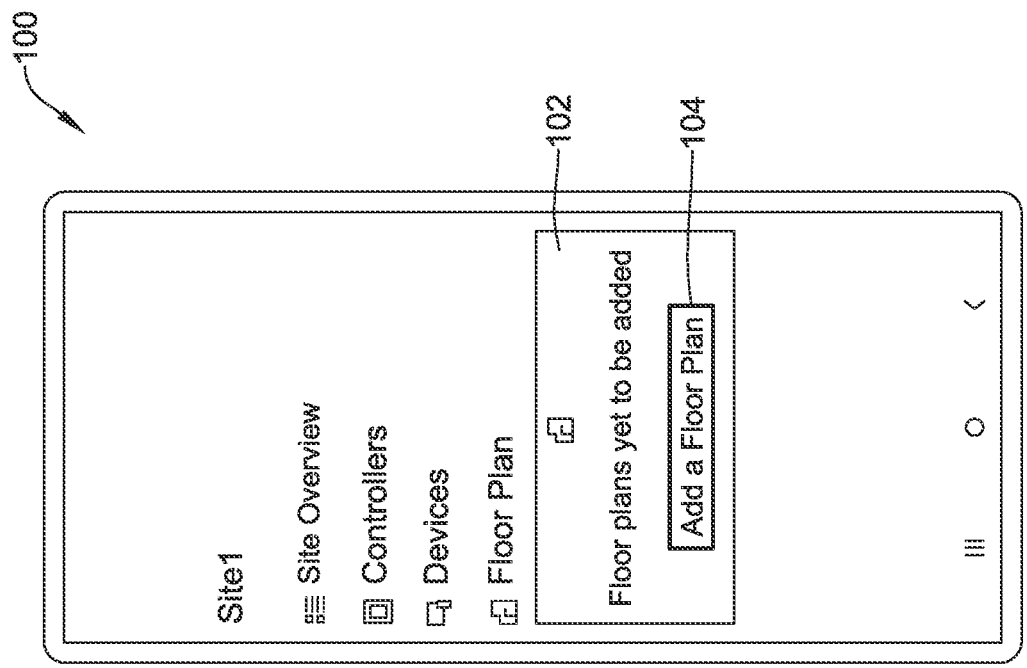
FIGS. 5 through 12 are screen shots showing how building control devices are configured using an illustrative mobile device.
Figure 6:
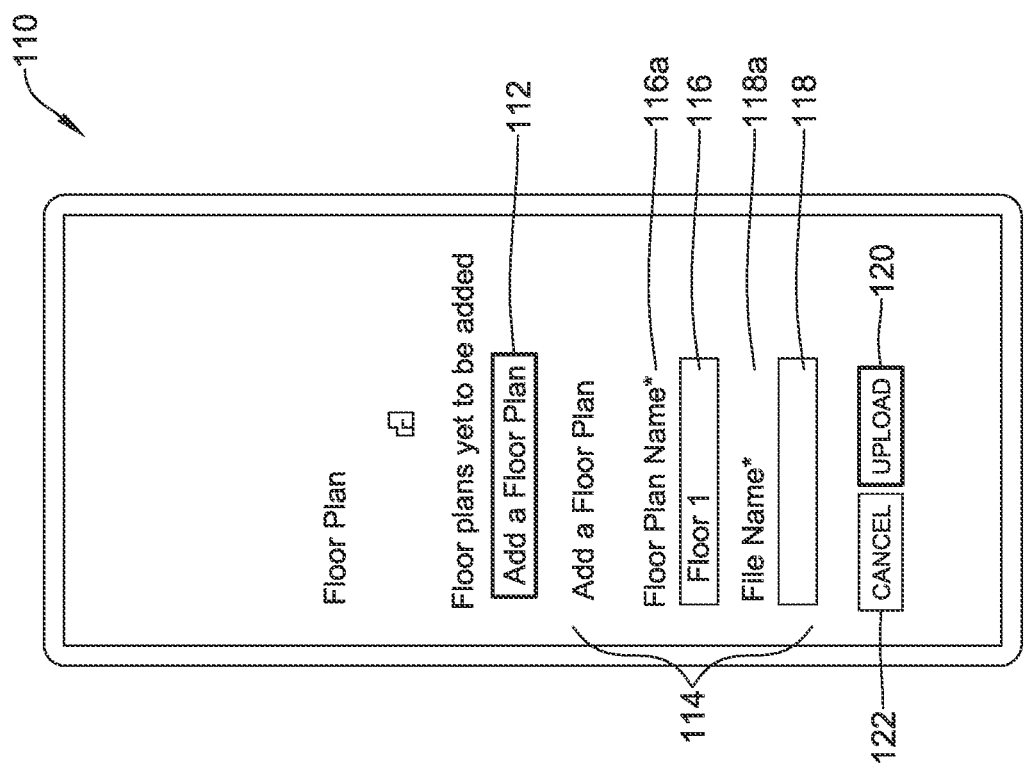

FIGS. 5 through 12 provide screen shots that illustrate the use of an application running on a mobile device to configure a plurality of security devices. FIG. 5 provides an illustrative screen shot of a screen 100 that includes a site overview informing a user via a popup 102 that no floor plan has been added yet. The popup 102 includes an ADD A FLOOR PLAN button 104 that a user can select in order to add a floor plan. Pressing the ADD A FLOOR PLAN button 104 causes the mobile device to display an illustrative screen 110, as seen in FIG. 6.

FIG. 6 shows the screen 110, which allows the user to add a floor plan via an ADD A FLOOR PLAN button 112. The screen 110 includes an Add floor plan section 114 that the user can use to inform the mobile device which floor plan to add. The Add floor plan section 114 includes a box 116 for adding a floor plan name and a box 118 for adding a file name that corresponds to the floor plan that was named in the box 116. The Add floor plan section 114 includes a box 116a that informs the user what should be entered into the box 116. The Add floor plan section 114 also includes a box 118a that informs the user what should be entered into the box 118. Once the user has entered the name of the floor plan into box 116 and the file name corresponding to that floor plan into box 118, the user can select an UPLOAD button 120. Selecting the UPLOAD button 120 will cause the application running on the mobile device to upload the named floor plan to the mobile device. Selecting a CANCEL button 122 will cancel the operation of uploading a floor plan.

Although not shown in FIG. 6, in some cases the screen 110 may prompt a user to take a picture of a floorplan using the camera 28 of the mobile device, resulting in a corresponding floorplan image file being stored on the mobile device. In some cases, box 118 of FIG. 6 may be automatically populated with the name of the corresponding floorplan image file.

Figure 7:
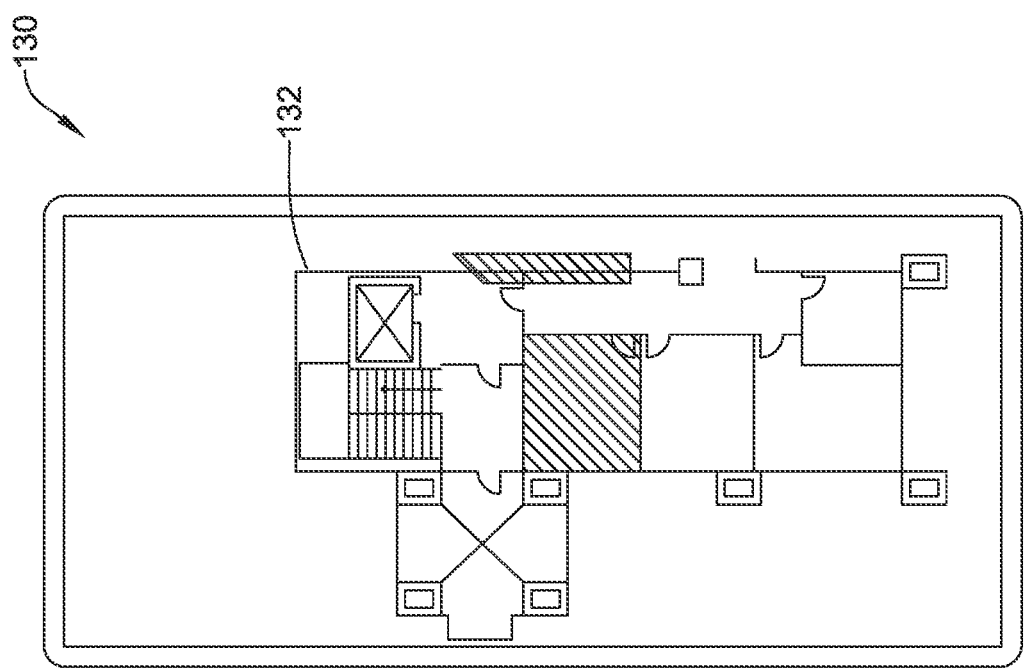

FIG. 7 provides an illustrative screen shot showing a screen 130 that can be displayed by the mobile device after uploading a floor plan (as in FIG. 6). The screen 130 includes a floor plan 132 that is displayed by the mobile device. Once the floor plan has been uploaded, the user can proceed with placing icons on the floor plan at positions that correspond to the actual positions of the security devices within the space represented by the floor plan. The user may select a particular icon on the floor plan, and once selected, scan a scannable code on the corresponding security device in order to obtain first configuration information regarding the particular security device, and then the user can subsequently enter additional or second configuration information for the particular security device. This may be done for each of the security devices 14a and 14b.

Figure 8:
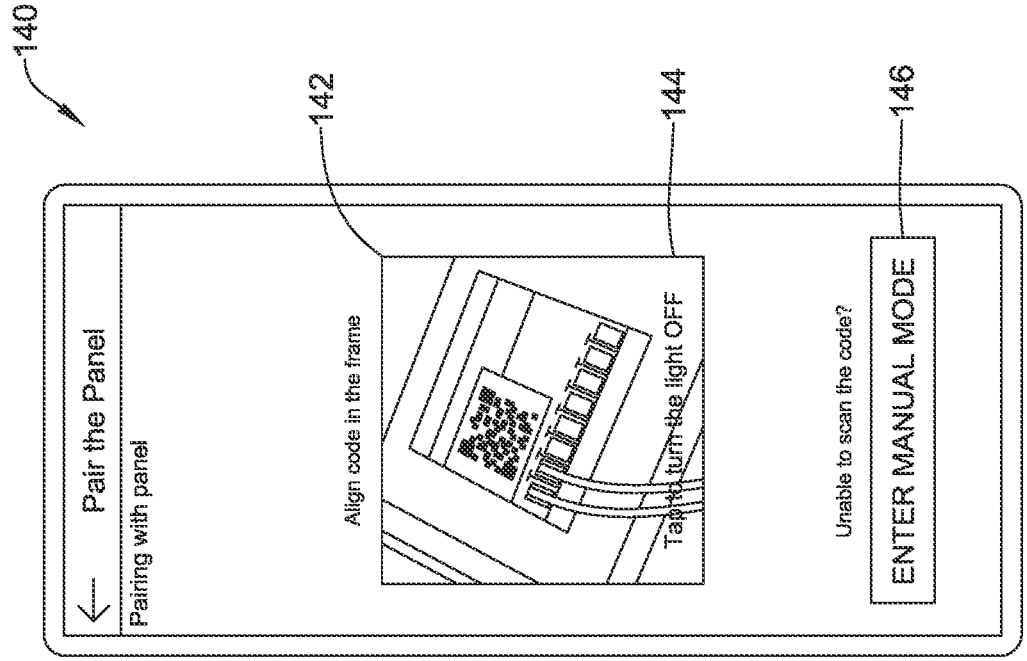

FIG. 8 provides an illustrative screen shot showing a screen 140 that shows scanning a scannable code for a particular security device. The screen 140 includes a frame 142 in which the user is to align an image of the scannable code that is provided by a camera 28 of the mobile device. The scannable code may be on the outside of the particular security device. In some cases, the scannable code may be in an interior of the particular security device, requiring temporarily removing or otherwise opening a cover of the particular security device in order to expose the scannable code. In the particular example shown in FIG. 8, the scannable code is a QR code. The user can move the mobile device around in order to align the image within the frame 142, for example. Once the image is aligned with the frame 142, the mobile device captures the image of the QR code and decodes the information that is represented by the QR code. This makes up at least a portion of the first configuration information. In some cases, the user may be able to manually select when to capture the image.

The screen 140 also includes a message 144 that provides the user with an option to turn off the camera flash of the mobile device by tapping an appropriate location on the screen 140. The screen 140 also includes an ENTER MANUAL MODE button 146. The user can select the ENTER MANUAL MODE button 146 if they are having trouble capturing an image of the QR code. This may occur if the QR code is partially obscured, or has a crease in it or is dirty. This may also occur if the camera flash is not functioning and the QR code is located in a relatively dark environment, for example. Selecting the ENTER MANUAL MODE button 146 may permit the user to manually enter the information that would otherwise have been captured by scanning the QR code.

Figure 9:
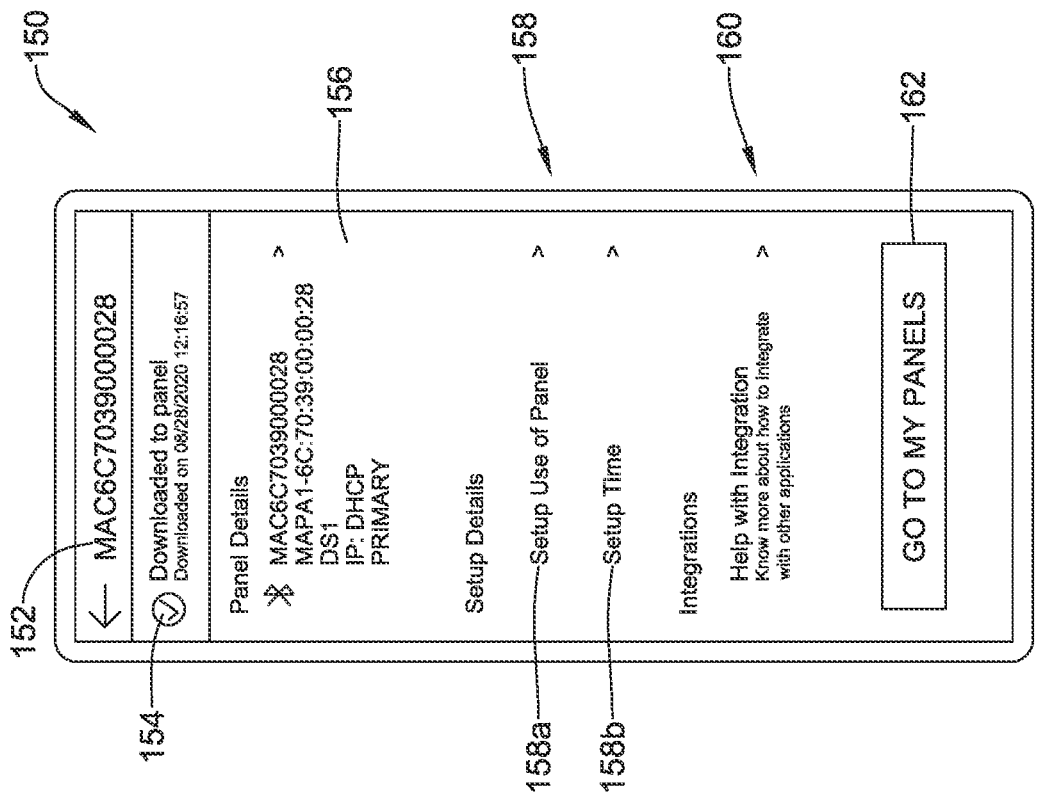

FIG. 9 provides an illustrative screen shot showing a screen 150 that provides the user with options for configuring a security panel, which may be considered as being an example of a security device. A MAC address 152 of the security panel is displayed at the top of the screen 150, as well as a message 154 indicating that information has been successfully downloaded/scanned from the security panel. The screen 150 includes a section 156 that includes additional information about the selected security panel. The screen 150 includes a Setup Details section 158 having a Setup Use of Panel menu 158a and a Setup Time menu 158b. The screen 150 includes an Integrations menu 160 as well as a GO TO MY PANELS button 162. Selecting an appropriate option under the Setup Use of Panel menu 158a causes the mobile device to display a screen 170, as seen in FIG. 10.

Figure 10:
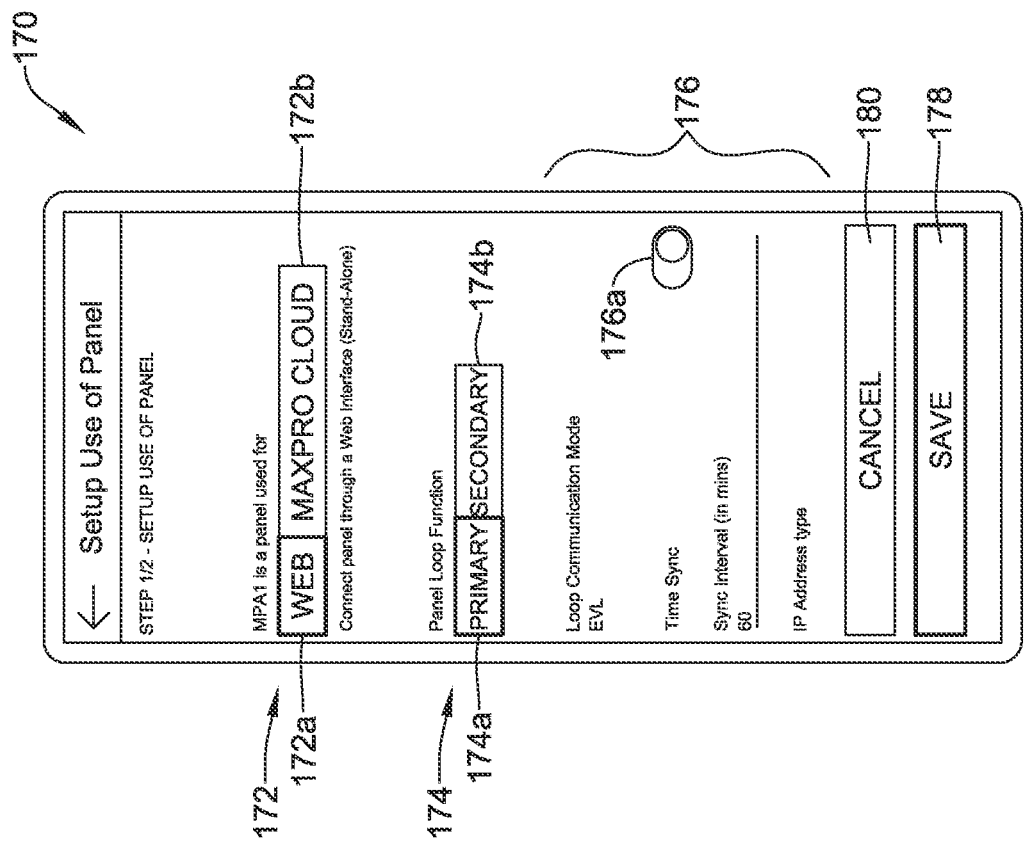

FIG. 10 provides an illustrative screen shot showing the screen 170 that provides the user with additional options for configuring the security panel. The screen 170 includes a connection section 172 that has a WEB option 172a and a MAXPRO CLOUD option 174. In this example, the WEB option 172a has been selected. For this particular security panel, the screen 170 includes a Panel Loop Function section 174 that has a PRIMARY option 174a and a SECONDARY option 174b. In this example, the PRIMARY option 174a has been selected. The screen 170 includes a section 176 that identifies a loop communication mode, and has an ON/OFF radio button 176a pertaining to a time sync setting. In this example, the radio button 176a is set to ON. A SAVE button 178, if selected, instructs the mobile device to save the settings that have been selected. A CANCEL button 180, if selected, cancels the operation and will cause the mobile device to revert to a previous screen. This information may be considered part of the second configuration information collected by the user.

Figure 11:
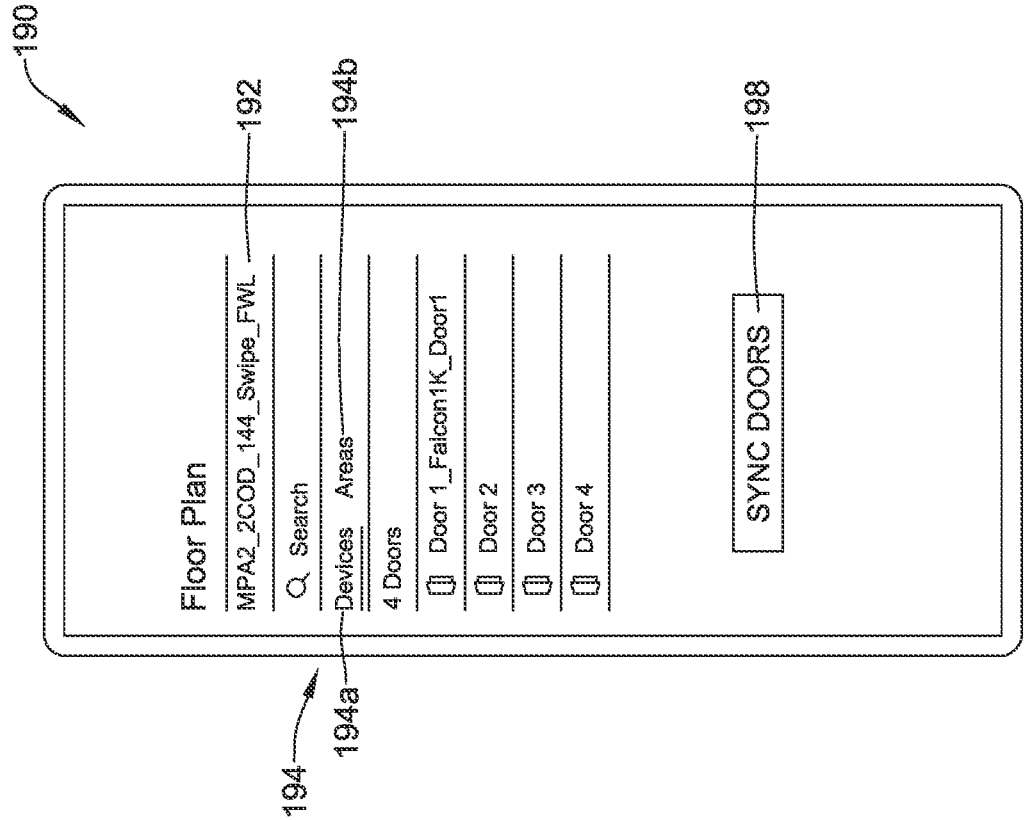

FIG. 11 provides an illustrative screen shot showing a screen 190 that shows several devices having been added to an uploaded floor plan. The name of the floor plan is shown at 192. The screen 190 includes an options bar 194 having a DEVICES option 194a and an AREAS option 194b. In this example, the DEVICES option 194a has been selected. The screen 190 includes a list 196 of installed security door devices that correspond to the selected and uploaded floor plan. The screen 190 includes a SYNC DOORS button 198 that, if selected, instructs the mobile device to upload the saved configurations to the remote server.

Figure 12:
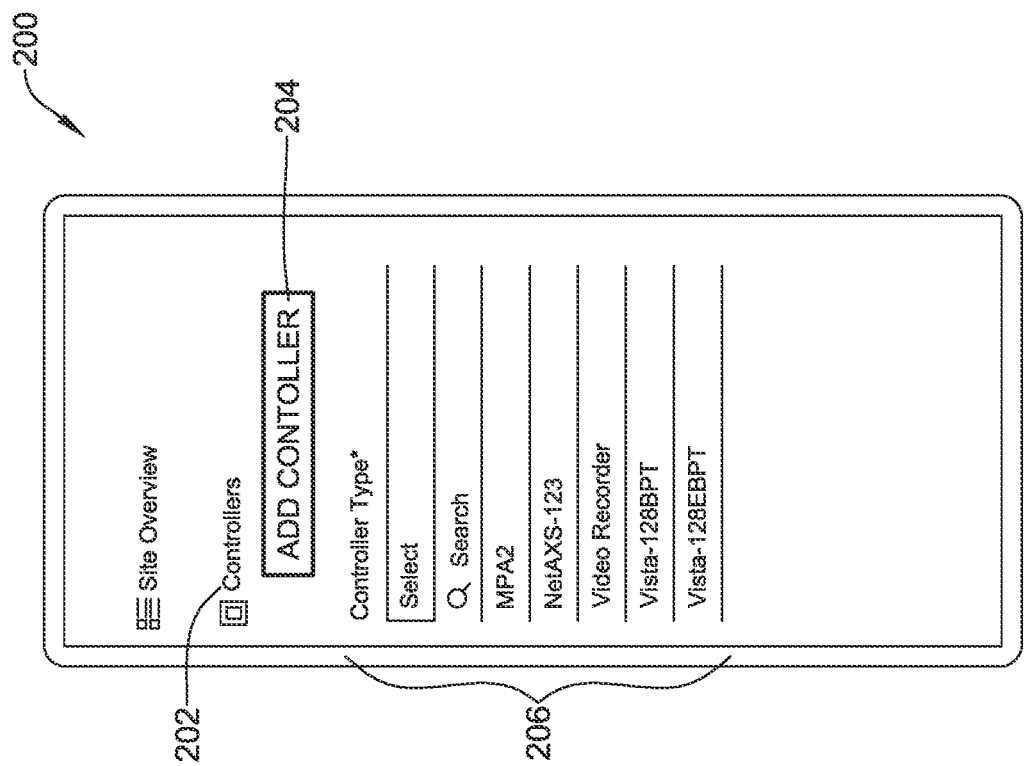

FIG. 12 provides an illustrative screen shot showing a screen 200 that provides a user an opportunity to add and configure a controller. The screen 200 includes an ADD CONTROLLER button 204 under a Controller tab 202. The screen 200 includes a section 206 that enables the user to make one or more appropriate selections for the particular controller they are adding.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:
1. A method of configuring a plurality of security devices of a building control system using an application running on a mobile device, the method comprising:
  using the application on the mobile device to access a floor plan corresponding to a building space having the plurality of security devices each installed at a corre- sponding physical location in the building space, the plurality of security devices awaiting configuration;

informing the application of a relative position of each of the plurality of security devices within the building space by placing an icon for each of the plurality of security devices at a location on the floor plan that corresponds to the physical location of the corresponding security device in the building space;

scanning a scannable code secured relative to a particular security device of the plurality of security devices using the mobile device, the scannable code encoding first configuration information for the particular security device;

accepting second configuration information for the particular security device via one or more screens that are displayed by the application running on the mobile device, wherein the second configuration information includes additional options and/or settings for configuring the particular security device beyond the first configuration information and the location of the particular security device on the floor plan;

saving the first and second configuration information for the particular security device within a memory of the mobile device;

repeating the scanning, receiving and saving steps for each of the plurality of security devices;

uploading the saved first and second configuration information for each of the plurality of security devices to a remote server;

wherein the plurality of security devices installed within the building space are divided into a plurality of groups, with a different user assigned to each group, wherein each user is assigned a different mobile device for configuring the security devices within their assigned group, and the different mobile devices uploading their saved first and second configuration information for each of the security devices in their assigned group to the remote server;

performing the scanning, receiving and saving steps for each of the plurality of security devices before the remote server is available to receive the upload of the first and second configuration information; and operating the building control system using the uploaded first and second configuration information.

2. The method of claim 1, wherein using the application on the mobile device to access a floor plan comprises scanning or taking a photo of an available copy of the floor plan using a camera of the mobile device.

3. The method of claim 1, wherein using the application on the mobile device to access a floor plan comprises downloading the floor plan from a remote source.

4. The method of claim 1, wherein the floor plan is programmed into the application running on the mobile device.

5. The method of claim 1, wherein using the application on the mobile device to access a floor plan further comprises accessing a list of security devices installed in the building space along with corresponding icons for each of the security devices included in the list of security devices.

6. The method of claim 5, wherein informing the application of the relative position of each of the plurality of security devices within the building space comprises dragging each icon from the list of security devices and dropping the icon at a location on the floor plan that corresponds to the physical location of the corresponding security device in the building space.

7. The method of claim 1, wherein scanning the scannable code secured relative to the particular security device further comprises removing a cover of the particular security device in order to access the scannable code.

8. The method of claim 1, wherein the scannable code comprises a bar code or a QR code that is scannable by a camera of the mobile device.

9. The method of claim 1, wherein the first configuration information encoded by the scannable code comprises a unique identifier that uniquely identifies the particular security device.

10. The method of claim 1, wherein the first configuration information encoded by the scannable code comprises one or more of a Media Access Control (MAC) address for the particular security device and model information for the particular security device.

11. The method of claim 10, wherein the second configuration information comprises a network address for the particular security device.

12. The method of claim 1, wherein accepting the second configuration information for the particular security device comprises:

soliciting the second configuration information needed to configure the particular security device via one or more screens that are displayed by the application running on the mobile device; and accepting at least some of the solicited information via one or more screens that are displayed by the application running on the mobile device.

13. The method of claim 1, wherein at least some of the security devices comprise one or more of security cameras and access control devices.

14. A method of configuring a plurality of building control devices of a building control system using an application running on a mobile device, the method comprising:

using the application on the mobile device to access a floor plan corresponding to a building space having the plurality of building control devices each installed at a corresponding physical location in the building space, the plurality of building control devices awaiting configuration;

using the application of the mobile device to display a list of building control devices;

informing the application of a relative position of each of the plurality of building control devices within the building space by dragging an icon from the list of building control devices for each of the plurality of building control devices and dropping the icon at a location on the floor plan that corresponds to the physical location of the corresponding building control device in the building space;

scanning a scannable code secured relative to a particular building control device of the plurality of building control devices using the mobile device, the scannable code encoding first configuration information for the particular building control device, wherein the first configuration information includes a MAC address for the particular building control device;

accepting from a user second configuration information for the particular building control device via one or more screens that are displayed by the application running on the mobile device, wherein the second configuration information includes additional options and/or settings for configuring the particular building control device beyond the first configuration information and the location of the particular building control device on the floor plan, wherein the second configuration information includes an IP address for the particular building control device;

saving the first and second configuration information for the particular building control device within a memory of the mobile device;

repeating the scanning, receiving and saving steps for each of the plurality of building control devices;

uploading the saved first and second configuration information for each of the plurality of building control devices to a remote server;

wherein the plurality of building control devices installed within the building space are divided into a plurality of groups, with a different user assigned to each group, wherein each user is assigned a different mobile device for configuring the building control devices within their assigned group, and the different mobile devices uploading their saved first and second configuration information for each of the building control devices in their assigned group to the remote server; and operating the building control system using the uploaded first and second configuration information.

15. The method of claim 14, wherein the first configuration information encoded by the scannable code comprises model information for the particular building control device.

16. A non-transient, computer-readable storage medium having stored thereon instructions that when executed by one or more processors of a mobile device cause the mobile device to:

access a floor plan corresponding to a building space having a plurality of security devices installed therein, the plurality of security devices awaiting configuration, wherein the plurality of security devices installed within the building space are divided into a plurality of groups, with a different user assigned to each group, wherein a first group of the security devices of the plurality of groups is assigned to the mobile device for configuring the security devices within the first group;

receiving a relative position of each of the plurality of security devices within the first group by receiving a placement location of an icon representing each of the plurality of security devices within the first group in an appropriate position within the floor plan;

scan a scannable code disposed relative to a particular security device of the plurality of security devices within the first group in order to identify the particular security device;

configure the identified security device by receiving appropriate information collected via one or more screens that are displayed by the application running on the mobile device, wherein the appropriate information includes additional options and/or settings for the identified security device beyond the relative position of the identified security device within the building space;

save a configuration for the particular security device within a memory of the mobile device;

repeat the scanning, configuring and saving steps for each of the plurality of security devices within the first group;

upload the saved configurations for each of the plurality of security devices to a remote server; and perform the scanning, receiving and saving steps for each of the plurality of security devices before the remote server is available to receive the upload of the saved configuration information for each of the plurality of security devices.

\* \* \* \* \*